(12) United States Patent
Chen

(10) Patent No.: US 10,794,413 B2
(45) Date of Patent: Oct. 6, 2020

(54) CONNECTION ASSEMBLY

(71) Applicant: NANYA TECHNOLOGY CORPORATION, New Taipei (TW)

(72) Inventor: Chia-Fu Chen, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 0 days.

(21) Appl. No.: 16/278,743

(22) Filed: Feb. 19, 2019

(65) Prior Publication Data

US 2020/0173476 A1 Jun. 4, 2020

Related U.S. Application Data

(60) Provisional application No. 62/774,872, filed on Dec. 4, 2018.

(51) Int. Cl.
*F16B 9/00* (2006.01)
*F16J 15/02* (2006.01)

(52) U.S. Cl.
CPC ............. *F16B 9/054* (2018.08); *F16J 15/022* (2013.01)

(58) Field of Classification Search
CPC ......... F16B 9/054; F16J 15/022; H01R 33/22; H01R 33/94; H01R 33/971

USPC .......................................................... 439/300
See application file for complete search history.

(56) References Cited

U.S. PATENT DOCUMENTS

| | | | | |
|---|---|---|---|---|
| 6,821,160 | B2* | 11/2004 | Fink | H01R 13/512 |
| | | | | 439/595 |
| 8,689,517 | B2* | 4/2014 | Schaefer | E04C 3/06 |
| | | | | 52/710 |
| 9,190,767 | B2* | 11/2015 | Makimura | H01R 13/5219 |
| 2011/0053408 | A1* | 3/2011 | Tsuruta | H01R 13/621 |
| | | | | 439/362 |
| 2015/0126055 | A1* | 5/2015 | Morita | H01R 13/5202 |
| | | | | 439/323 |
| 2018/0348022 | A1* | 12/2018 | Ushiro | G01D 11/30 |
| 2019/0052011 | A1* | 2/2019 | Kondo | F16B 9/052 |

* cited by examiner

*Primary Examiner* — Peter G Leigh
(74) *Attorney, Agent, or Firm* — CKC & Partners Co., LLC

(57) ABSTRACT

A connection assembly includes a housing, an adaptor and a conducting element. The housing has a chamber and an opening communicating with the chamber. The adaptor has a first through hole. The adaptor is at least partially connected outside the housing. The opening communicates with the first through hole. The conducting element penetrates through the first through hole and the opening. The conducting element is detachably connected with the adaptor.

19 Claims, 6 Drawing Sheets

CONNECTION ASSEMBLY

CROSS-REFERENCE TO RELATED APPLICATION

This application claims the priority benefit of U.S. provisional application Ser. No. 62/774,872, filed on Dec. 4, 2018. The entirety of the above-mentioned patent applications are hereby incorporated by references herein and made a part of specification.

BACKGROUND

Technical Field

The present disclosure relates to a connection assembly.

Description of Related Art

In the semiconductor industry, a wide variety of manufacturing and testing processes are involved. Thus, different kinds of machines or equipment are employed in the factory.

For some kinds of machine and equipment, some accessories are frequently replaced and fitted according to the actual situations. Therefore, the strength and durability of the connection between the accessories and the relevant machine/equipment is particularly important in the industry.

SUMMARY

A technical aspect of the present disclosure is to provide a connection assembly, which can protect the housing from abrasion due to frequent assembly and disassembly of the conducting element relative to the housing.

According to an embodiment of the present disclosure, a connection assembly includes a housing, an adaptor and a conducting element. The housing has a chamber and an opening communicating with the chamber. The adaptor has a first through hole. The adaptor is at least partially connected outside the housing. The opening communicates with the first through hole. The conducting element penetrates through the first through hole and the opening. The conducting element is detachably connected with the adaptor.

In one or more embodiments of the present disclosure, the adaptor has an internal thread disposed on an inner wall defining the first through hole. The conducting element has an external thread disposed on an outer wall. The external thread is configured to couple with the internal thread.

In one or more embodiments of the present disclosure, a material of the adaptor includes metal.

In one or more embodiments of the present disclosure, the conducting element is a feedthrough.

In one or more embodiments of the present disclosure, the adaptor includes a flange and a cylinder. The flange has a first surface and a second surface opposite to the first surface. The first surface is configured to abut against an outer surface of the housing away from the chamber. The cylinder is connected with the second surface. The first through hole penetrates through the flange and the cylinder.

In one or more embodiments of the present disclosure, the flange has a plurality of second through holes disposed around the first through hole. The housing has a plurality of screw holes. The screw holes are disposed around the opening. The connection assembly further includes a plurality of screws. The screws are configured to penetrate through the second through holes and be secured at the screw holes.

In one or more embodiments of the present disclosure, the connection assembly further includes a sealing element. The sealing element surrounds the first through hole and is located between the flange and the housing.

In one or more embodiments of the present disclosure, the sealing element is a gasket.

In one or more embodiments of the present disclosure, the flange has a groove disposed on the first surface. The sealing element is an O-ring deformed in the groove.

In one or more embodiments of the present disclosure, the adaptor includes a first cylinder and a second cylinder. The first cylinder is configured to abut against an outer surface of the housing away from the chamber. The second cylinder is connected with the first cylinder. The first through hole penetrates through the first cylinder and the second cylinder. The housing has an internal thread disposed on an inner wall defining the opening. The second cylinder has an external thread disposed on an outer wall. The external thread is configured to couple with the internal thread.

In one or more embodiments of the present disclosure, the connection assembly further includes a sealing element. The sealing element surrounds the first through hole and is located between the first cylinder and the housing.

In one or more embodiments of the present disclosure, the sealing element is a gasket.

In one or more embodiments of the present disclosure, the first cylinder has a groove. The sealing element is an O-ring deformed in the groove.

In one or more embodiments of the present disclosure, the connection assembly further includes a nut. The nut has an internal thread. The adaptor includes a first cylinder and a second cylinder. The first cylinder is configured to abut against an outer surface of the housing away from the chamber. The second cylinder is connected with the first cylinder. The first through hole penetrates through the first cylinder and the second cylinder. The second cylinder has an external thread disposed on an outer wall. The external thread is configured to couple with the internal thread of the nut located in the chamber.

In one or more embodiments of the present disclosure, the connection assembly further includes a sealing element. The sealing element surrounds the first through hole and is located between the first cylinder and the housing.

In one or more embodiments of the present disclosure, the sealing element is a gasket.

In one or more embodiments of the present disclosure, the first cylinder has a groove. The sealing element is an O-ring deformed in the groove.

In one or more embodiments of the present disclosure, the connection assembly further includes a sealing element. The sealing element surrounds the first through hole and is located between the nut and the housing.

In one or more embodiments of the present disclosure, the sealing element is a gasket.

In one or more embodiments of the present disclosure, the nut has a groove. The sealing element is an O-ring deformed in the groove.

When compared with the prior art, the above-mentioned embodiments of the present disclosure have at least the following advantages:

(1) The conducting element is detachably connected with the adaptor and is not directly in contact with the housing. In this way, even if the conducting element is frequently installed to or removed from the adaptor in practical applications, there is no abrasion to the housing. Therefore, in the case that the housing is made of soft material, such as aluminum, for example, the housing is effectively protected from abrasion due to friction or collision caused from frequent assembly and disassembly of the conducting element relative to the housing.

(2) In case that the adaptor is worn due to friction or collision caused from frequent assembly and disassembly of the conducting element relative to the adaptor, the worn adaptor can be easily replaced with a new one, which is a convenient and cost saving procedure to maintain the working condition of the connection assembly.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
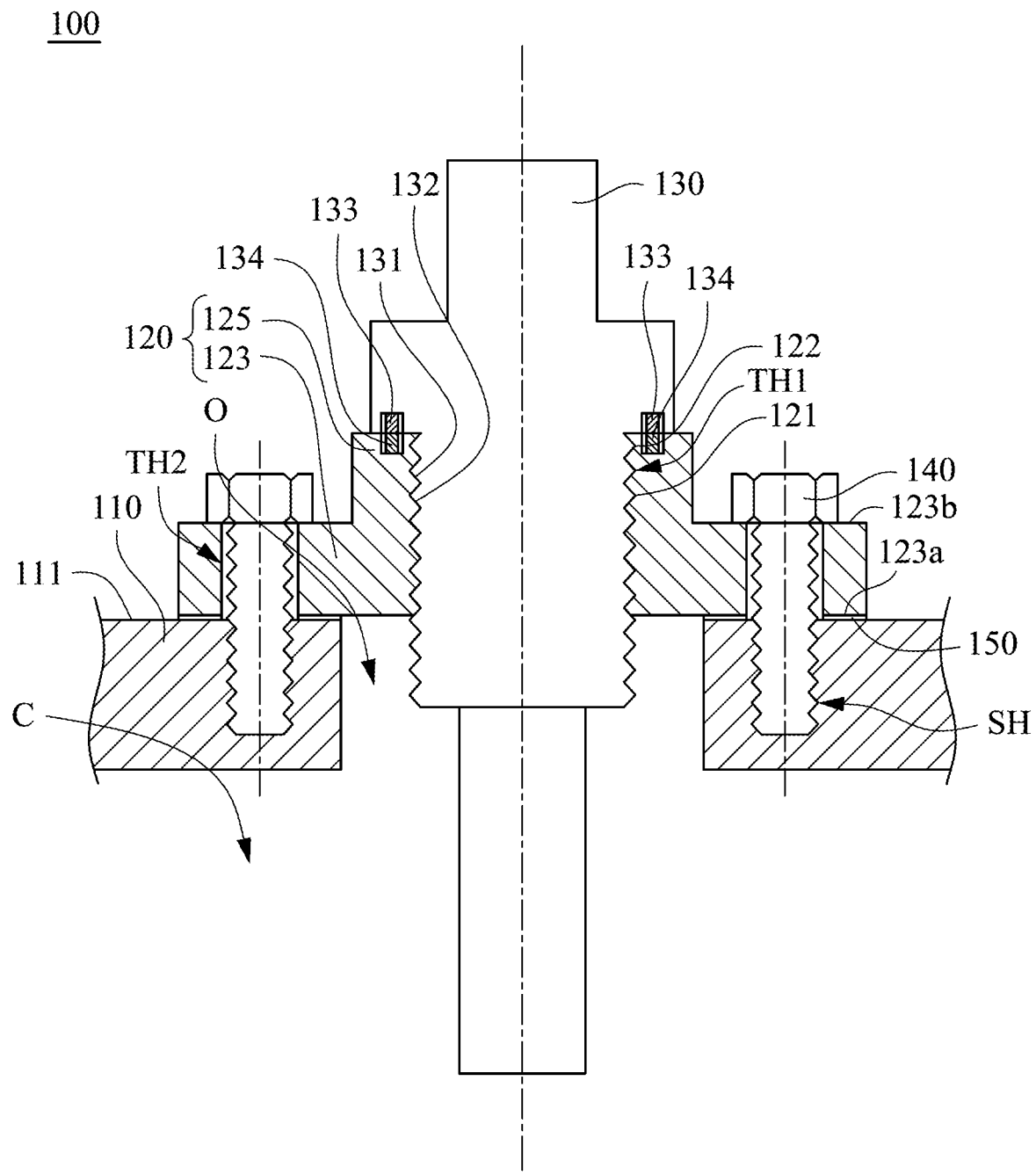
FIG. 1 is a sectional view of a connection assembly according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a sectional view of a connection assembly 100 according to an embodiment of the present disclosure. In this embodiment, as shown in FIG. 1, a connection assembly 100 includes a housing 110, an adaptor 120 and a conducting element 130. The housing 110 has a chamber C and an opening O. The opening O is communicated with the chamber C. The adaptor 120 has a first through hole TH1. The adaptor 120 is at least partially connected outside the housing 110. The opening O of the housing 110 communicates with the first through hole TH1 of the adapter 120. The conducting element 130 penetrates through the first through hole TH1 and the opening O. The conducting element 130 is detachably connected with the adaptor 120, such that the conducting element 130 is fixed relative to the housing 110. In practical applications, the conducting element 130 is a feedthrough.

As mentioned above, the conducting element 130 is detachably connected with the adaptor 120. Thus, the conducting element 130 is not directly in contact with the housing 110. In this way, even if the conducting element 130 is frequently installed to or removed from the adaptor 120 in practical applications, there is no abrasion to the housing 110. Therefore, in the case that the housing 110 is made of soft material, such as aluminum, for example, the housing 110 is effectively protected from abrasion due to friction or collision caused from frequent assembly and disassembly of the conducting element 130 relative to the housing 110.

Furthermore, in case that the adaptor 120 is worn due to friction or collision caused from frequent assembly and disassembly of the conducting element 130 relative to the adaptor 120, the worn adaptor 120 can be easily replaced with a new one, which is a convenient and cost saving procedure to maintain the working condition of the connection assembly. In practical applications, the material of the adaptor 120 includes metal. However, this does not intend to limit the present disclosure.

Furthermore, as shown in FIG. 1, the adaptor 120 has an internal thread 121. The internal thread 121 is disposed on an inner wall 122 of the adaptor 120 defining the first through hole TH1. On the contrary, the conducting element 130 has an external thread 131. The external thread 131 is disposed on an outer wall 132 of the conducting element 130. Practically speaking, when the conducting element 130 is connected with the adaptor 120, the external thread 131 of the conducting element 130 is configured to couple with the internal thread 121 of the adaptor 120.

To be specific, as mentioned above, when the internal thread 121 of the adaptor 120 is worn due to friction or collision caused from frequent assembly and disassembly of the conducting element 130 relative to the adaptor 120, the worn adaptor 120 can be easily replaced with a new one.

Moreover, as shown in FIG. 1, the adaptor 120 includes a flange 123 and a cylinder 125. The flange 123 has a first surface 123a and a second surface 123b. The second surface 123b is opposite to the first surface 123a. The first surface 123a of the flange 123 is configured to abut against an outer surface 111 of the housing 110 away from the chamber C. In other words, the flange 123 is located outside the housing 110. The cylinder 125 is connected with the second surface 123b of the flange 123. The first through hole TH1 penetrates through the flange 123 and the cylinder 125.

In addition, the flange 123 has a plurality of second through holes TH2. The second through holes TH2 are disposed around the first through hole TH1. On the other hand, the housing 110 has a plurality of screw holes SH. The screw holes SH are disposed around the opening O of the housing 110. The connection assembly 110 further includes a plurality of screws 140. The screws 140 are configured to penetrate through the second through holes TH2 of the flange 123 and be secured at the screw holes SH of the housing 110. When the screws 140 penetrate through the second through holes TH2 of the flange 123 and are secured at the screw holes SH of the housing 110, the flange 123 and thus the adaptor 120 is fixed on the outer surface 111 of the housing 110.

To maintain a vacuum environment in the chamber C of the housing 110 according to the actual situation, as shown in FIG. 1, the connection assembly 100 further includes a sealing element 150. The sealing element 150 surrounds the first through hole TH1 and is located between the flange 123 of the adaptor 120 and the housing 110. In this embodiment, the sealing element 150 is a gasket. However, this does not intend to limit the present disclosure.

Figure 2:
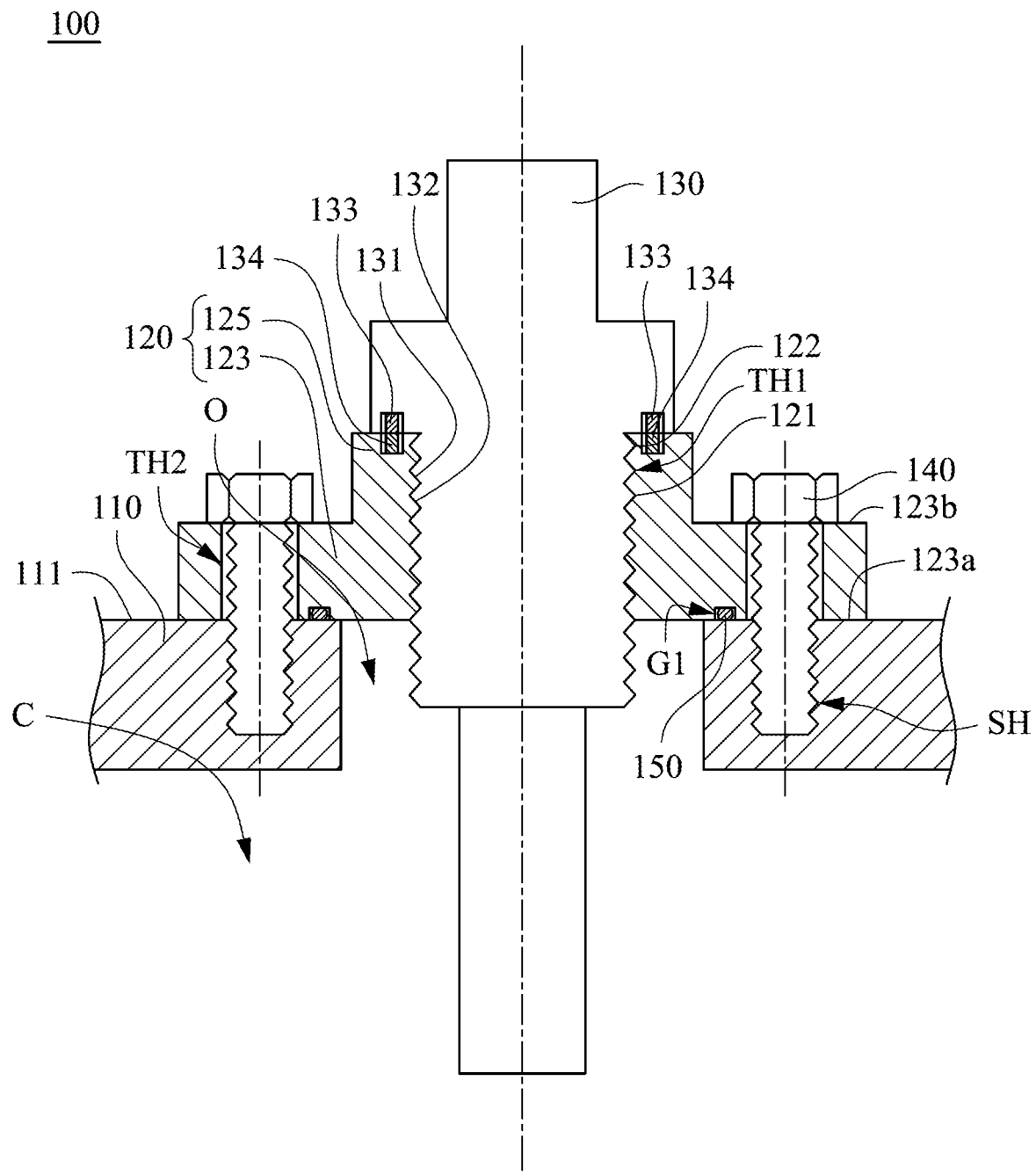
FIG. 2 is a sectional view of a connection assembly according to another embodiment of the present disclosure.

Reference is made to FIG. 2. FIG. 2 is a sectional view of a connection assembly 100 according to another embodiment of the present disclosure. In this embodiment, as shown in FIG. 2, the flange 123 of the adaptor 120 has a groove G1 disposed on the first surface 123a. The sealing element 150 is an O-ring which is deformed in the groove G1 to facilitate the effectiveness of sealing.

Figure 3:
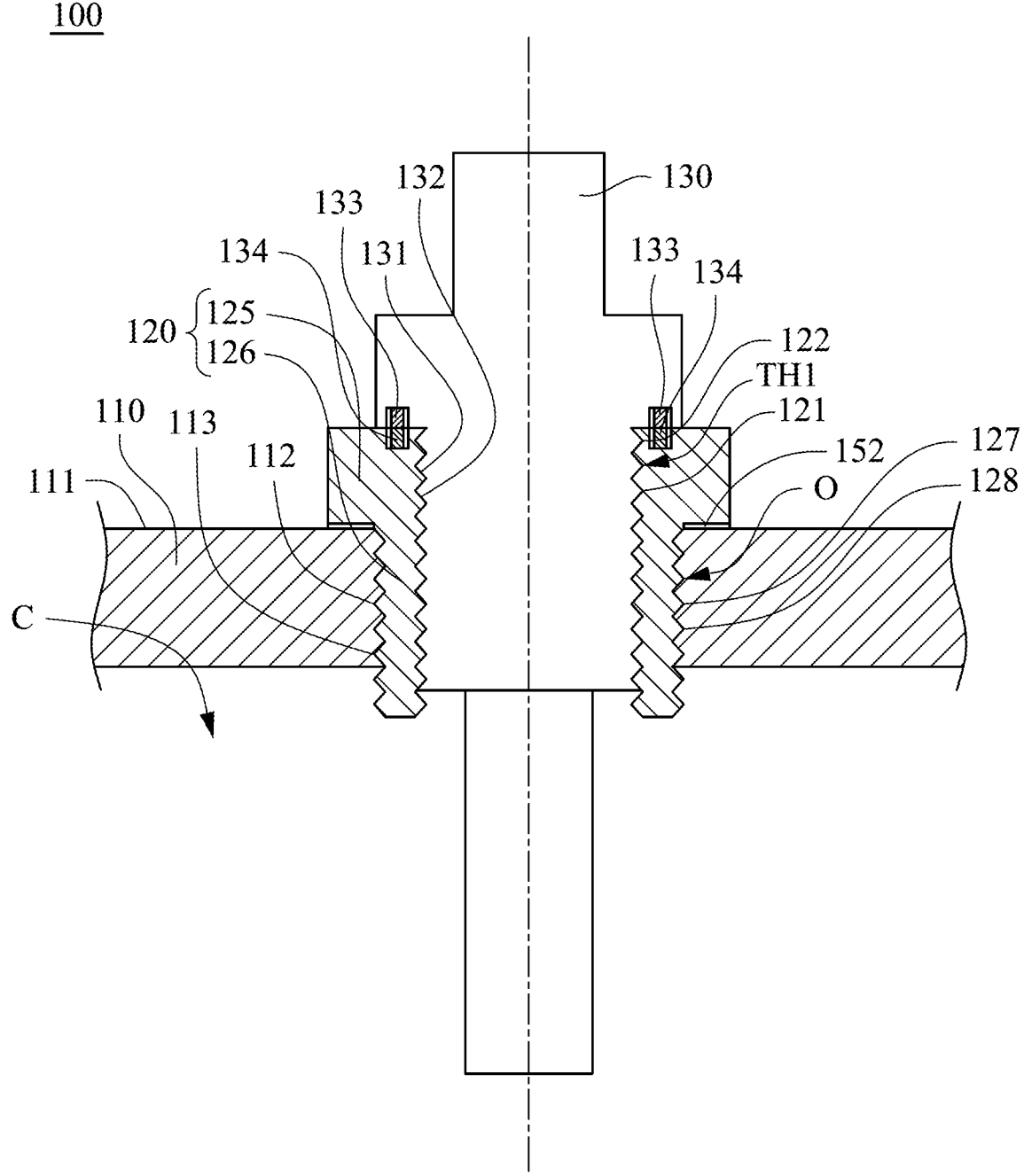
FIG. 3 is a sectional view of a connection assembly according to a further embodiment of the present disclosure.

Reference is made to FIG. 3. FIG. 3 is a sectional view of a connection assembly 100 according to a further embodiment of the present disclosure. In this embodiment, as shown in FIG. 3, the adaptor 120 includes a first cylinder 125 and a second cylinder 126. The first cylinder 125 is configured to abut against the outer surface 111 of the housing 110 away from the chamber C. In other words, the first cylinder 125 is located outside the housing 110. The second cylinder 126 is connected with the first cylinder 125. The first through hole TH1 penetrates through the first cylinder 125 and the second cylinder 126. The housing 110 has an internal thread 112. The internal thread 112 is disposed on an inner wall 113 defining the opening O. On the contrary, the second cylinder 126 has an external thread 127. The external thread 127 is disposed on an outer wall 128 of the second cylinder 126. The external thread 128 of the second cylinder 126 is configured to couple with the internal thread 112 of the housing 110. When the external thread 127 of the second cylinder 126 couples with the internal thread 112 of the housing 110, the adaptor 120 is fixed to the housing 110.

To maintain a vacuum environment in the chamber C of the housing 110 according to the actual situation, as shown in FIG. 3, the connection assembly 100 further includes a sealing element 152. The sealing element 152 surrounds the first through hole TH1 and is located between the first cylinder 125 of the adaptor 120 and the housing 110. In this embodiment, the sealing element 152 is a gasket. However, this does not intend to limit the present disclosure.

Figure 4:
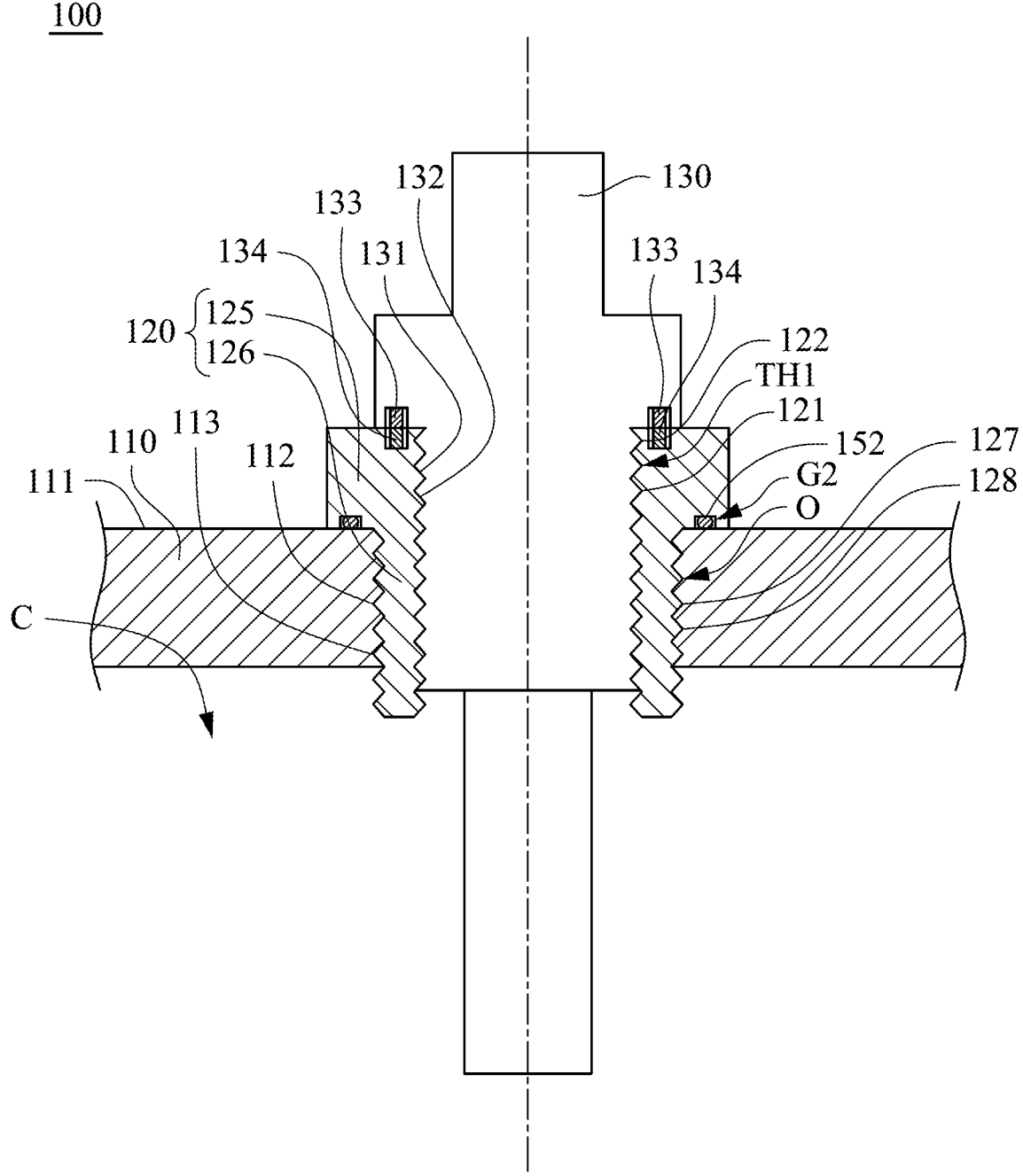
FIG. 4 is a sectional view of a connection assembly according to another embodiment of the present disclosure.

Reference is made to FIG. 4. FIG. 4 is a sectional view of a connection assembly 100 according to another embodiment of the present disclosure. In this embodiment, as shown in FIG. 4, the first cylinder 125 of the adaptor 120 has a groove G2. The sealing element 152 is an O-ring which is deformed in the groove G2 to facilitate the effectiveness of sealing.

Figure 5:
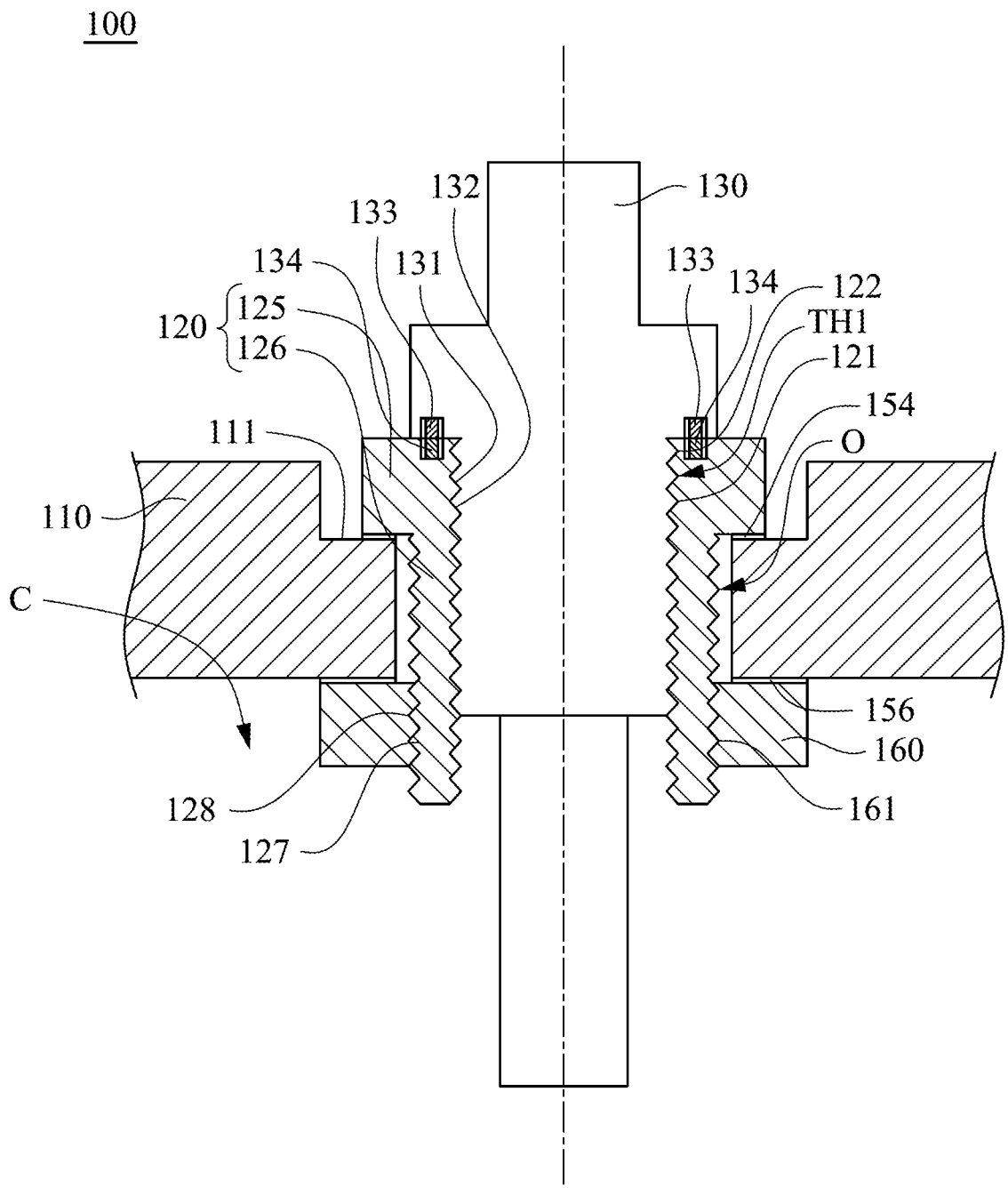
FIG. 5 is a sectional view of a connection assembly according to a further embodiment of the present disclosure.

Reference is made to FIG. 5. FIG. 5 is a sectional view of a connection assembly 100 according to a further embodiment of the present disclosure. In this embodiment, as shown in FIG. 5, the connection assembly 100 further includes a nut 160. The nut 160 has an internal thread 161. The adaptor 120 includes a first cylinder 125 and a second cylinder 126. The first cylinder 125 is configured to abut against an outer surface 111 of the housing 110 away from the chamber C. In other words, the first cylinder 125 is located outside the housing 110. The second cylinder 126 is connected with the first cylinder 125. The first through hole TH1 penetrates through the first cylinder 125 and the second cylinder 126. The second cylinder 126 has an external thread 127 disposed on an outer wall 128 of the second cylinder 126. The external thread 127 of the second cylinder 126 is configured to couple with the internal thread 161 of the nut 160 located in the chamber C. When the external thread 127 of the second cylinder 126 couples with the internal thread 161 of the nut 160, the adaptor 120 is fixed to the housing 110.

To maintain a vacuum environment in the chamber C of the housing 110 according to the actual situation, as shown in FIG. 5, the connection assembly 100 further includes a sealing element 154. The sealing element 154 surrounds the first through hole TH1 and is located between the first cylinder 125 of the adaptor 120 and the housing 110. Moreover, the connection assembly 100 further includes a sealing element 156. The sealing element 156 surrounds the first through hole TH1 and is located between the nut 160 and the housing 110. In this embodiment, the sealing elements 154, 156 are respectively a gasket. However, this does not intend to limit the present disclosure.

Figure 6:
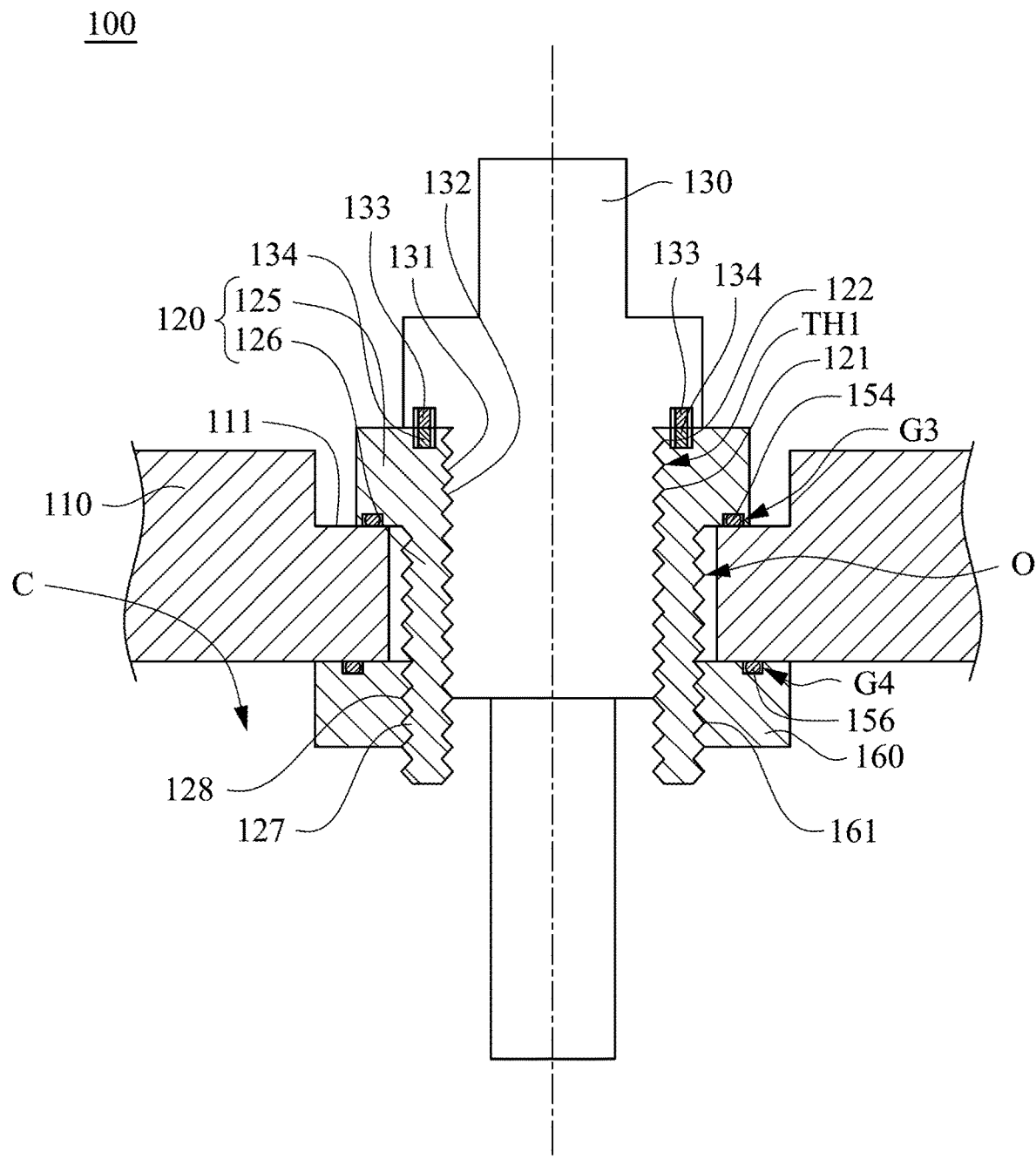
FIG. 6 is a sectional view of a connection assembly according to another embodiment of the present disclosure.

Reference is made to FIG. 6. FIG. 6 is a sectional view of a connection assembly 100 according to another embodiment of the present disclosure. In this embodiment, as shown in FIG. 6, the first cylinder 125 of the adaptor 120 has a groove G3. The sealing element 154 is an O-ring which is deformed in the groove G3 to facilitate the effectiveness of sealing. Meanwhile, the nut 160 has a groove G4. The sealing element 156 is an O-ring deformed in the groove G4 to facilitate the effectiveness of sealing as well.

In some embodiments, one or more sealing element(s) may also be installed between the conducting element 130 and the first cylinder 125 of the adaptor 120. For example, a O-ring 133 and a O-ring 134 can be both installed between the conducting element 130 and the first cylinder 125 of the adaptor 120 as illustrated in FIGS. 1-6, or at least one of the O-rings 133 and 134 (e.g., O-ring 133 alone or O-ring 134 alone) can be installed between the conducting element 130 and the first cylinder 125 of the adaptor 120. The O-ring 133 or the O-ring 134 may be deformed in the groove at an interface between the conducting element 130 and the first cylinder 125 to facilitate the effectiveness of sealing.

In conclusion, when compared with the prior art, the aforementioned embodiments of the present disclosure have at least the following advantages:

(1) The conducting element is detachably connected with the adaptor and is not directly in contact with the housing. In this way, even if the conducting element is frequently installed to or removed from the adaptor in practical applications, there is no abrasion to the housing. Therefore, in the case that the housing is made of soft material, such as aluminum, for example, the housing is effectively protected from abrasion due to friction or collision caused from frequent assembly and disassembly of the conducting element relative to the housing.

(2) In case that the adaptor is worn due to friction or collision caused from frequent assembly and disassembly of the conducting element relative to the adaptor, the worn adaptor can be easily replaced with a new one, which is a convenient and cost saving procedure to maintain the working condition of the connection assembly.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:
1. A connection assembly, comprising:
   a housing having a chamber and an opening communicating with the chamber;

an adaptor having a first through hole, the adaptor being at least partially connected outside the housing, the opening communicating with the first through hole; and a conducting element penetrating through the first through hole and the opening, the conducting element being detachably connected with the adaptor, wherein the adaptor has an internal thread disposed on an inner wall defining the first through hole, the conducting element has an external thread disposed on an outer wall, the external thread is configured to couple with the internal thread.

2. The connection assembly of claim 1, wherein a material of the adaptor comprises metal.

3. The connection assembly of claim 1, wherein the conducting element is a feedthrough.

4. The connection assembly of claim 1, wherein the adaptor comprises:
a flange having a first surface and a second surface opposite to the first surface, the first surface is configured to abut against an outer surface of the housing away from the chamber; and
a cylinder connected with the second surface, the first through hole penetrates through the flange and the cylinder.

5. The connection assembly of claim 4, wherein the flange has a plurality of second through holes disposed around the first through hole, the housing has a plurality of screw holes disposed around the opening, the connection assembly further comprises:
a plurality of screws configured to penetrate through the second through holes and be secured at the screw holes.

6. The connection assembly of claim 4, further comprising:
a sealing element surrounding the first through hole and located between the flange and the housing.

7. The connection assembly of claim 6, wherein the sealing element is a gasket.

8. The connection assembly of claim 6, wherein the flange has a groove disposed on the first surface, the sealing element is an O-ring deformed in the groove.

9. The connection assembly of claim 1, wherein the adaptor comprises:
a first cylinder configured to abut against an outer surface of the housing away from the chamber; and
a second cylinder connected with the first cylinder, the first through hole penetrates through the first cylinder and the second cylinder, the housing has an internal thread disposed on an inner wall defining the opening, the second cylinder has an external thread disposed on an outer wall, the external thread of the second cylinder is configured to couple with the internal thread of the housing.

10. The connection assembly of claim 9, further comprising:
a sealing element surrounding the first through hole and located between the first cylinder and the housing.

11. The connection assembly of claim 10, wherein the sealing element is a gasket.

12. The connection assembly of claim 10, wherein the first cylinder has a groove, the sealing element is an O-ring deformed in the groove.

13. The connection assembly of claim 1, further comprising:
a nut having an internal thread;
wherein the adaptor comprises:
a first cylinder configured to abut against an outer surface of the housing away from the chamber; and
a second cylinder connected with the first cylinder, the first through hole penetrates through the first cylinder and the second cylinder, the second cylinder has an external thread disposed on an outer wall, the external thread of the second cylinder is configured to couple with the internal thread of the nut located in the chamber.

14. The connection assembly of claim 13, further comprising:
a sealing element surrounding the first through hole and located between the first cylinder and the housing.

15. The connection assembly of claim 14, wherein the sealing element is a gasket.

16. The connection assembly of claim 14, wherein the first cylinder has a groove, the sealing element is an O-ring deformed in the groove.

17. The connection assembly of claim 13, further comprising:
a sealing element surrounding the first through hole and located between the nut and the housing.

18. The connection assembly of claim 17, wherein the sealing element is a gasket.

19. The connection assembly of claim 17, wherein the nut has a groove, the sealing element is an O-ring deformed in the groove.

* * * * *